United States Patent
Mermelstein et al.

(10) Patent No.: US 9,834,846 B2
(45) Date of Patent: Dec. 5, 2017

(54) SYSTEM AND METHOD FOR TRANSITIONING A REVERSIBLE SOLID OXIDE FUEL CELL SYSTEM BETWEEN GENERATION AND ELECTROLYSIS MODES

(71) Applicant: The Boeing Company, Chicago, IL (US)

(72) Inventors: Joshua M. Mermelstein, Laguna Niguel, CA (US); Sergio Espinoza, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 229 days.

(21) Appl. No.: 14/745,250

(22) Filed: Jun. 19, 2015

(65) Prior Publication Data

US 2016/0369416 A1 Dec. 22, 2016

(51) Int. Cl.
| | | |
|---|---|---|
| *H01M 8/18* | (2006.01) | |
| *C25B 15/02* | (2006.01) | |
| *C25B 1/04* | (2006.01) | |
| *H01M 8/04955* | (2016.01) | |
| *H01M 8/04223* | (2016.01) | |
| *H01M 8/04291* | (2016.01) | |
| *H01M 8/0438* | (2016.01) | |
| *H01M 8/04537* | (2016.01) | |
| *H01M 8/04664* | (2016.01) | |
| *H01M 8/04302* | (2016.01) | |
| *H01M 8/124* | (2016.01) | |

(52) U.S. Cl.
CPC ............... *C25B 15/02* (2013.01); *C25B 1/04* (2013.01); *H01M 8/04268* (2013.01); *H01M 8/04291* (2013.01); *H01M 8/04302* (2016.02); *H01M 8/04425* (2013.01); *H01M 8/04604* (2013.01); *H01M 8/04679* (2013.01); *H01M 8/04955* (2013.01); *H01M 8/186* (2013.01); *H01M 2008/1293* (2013.01); *Y02E 60/366* (2013.01); *Y02E 60/528* (2013.01)

(58) Field of Classification Search
CPC ............. H01M 8/186; H01M 8/04955; H01M 8/04268; H01M 8/04291; H01M 8/04425; H01M 8/04604; H01M 8/04679; H01M 8/04302; H01M 2008/1293
See application file for complete search history.

(56) References Cited

U.S. PATENT DOCUMENTS

2004/0185313 A1* 9/2004 Halter ............... H01M 8/04156
429/418

* cited by examiner

*Primary Examiner* — Jane Rhee
(74) *Attorney, Agent, or Firm* — Parsons Behle & Latimer

(57) ABSTRACT

A method for transitioning between fuel cell and electrolysis modes in a Reversible Solid Oxide Fuel Cell (RSOFC) system includes measuring and recording sensor data indicating a status of components associated with an RSOFC system coupled to an electrical power grid, the system comprising an RSOFC unit, a hydrogen compression system, a hydrogen storage system, and a water supply, determining a state of the RSOFC system based on the sensor data through a conditional logic algorithm, and transitioning the RSOFC system between the fuel cell mode and the electrolysis mode based upon the sensor data and the system state.

20 Claims, 9 Drawing Sheets

SYSTEM AND METHOD FOR TRANSITIONING A REVERSIBLE SOLID OXIDE FUEL CELL SYSTEM BETWEEN GENERATION AND ELECTROLYSIS MODES

GOVERNMENT RIGHTS

This invention was made with United States Government support under contract number N394309-14-C-1487 awarded by the U.S. Department of Defense. The United States Government has certain rights in this invention.

FIELD OF THE DISCLOSURE

The present disclosure is related to energy storage systems. More particularly, the present disclosure relates to a control system and method for transitioning a Reversible Solid Oxide Fuel Cell (RSOFC) energy storage system between energy generation and electrolysis modes.

BACKGROUND

Fuel cells are devices that convert chemical energy from a fuel, such as hydrogen, into electricity through a chemical reaction with oxygen or another oxidizing agent. There are several different types of fuel cells. Fuel cells generally include an anode, a cathode, and an electrolyte between the two. The most well-known type of fuel cell is the Proton Exchange Membrane (PEM) fuel cell, in which the electrolyte is a proton exchange membrane that allows ions (e.g. hydrogen ions) to pass through it, while electrons cannot. At the anode a catalyst oxidizes the hydrogen fuel, turning the fuel into positively charged ions and negatively charged electrons. The freed electrons travel through electrical conductors, thus producing the electric current output of the fuel cell. The hydrogen ions, on the other hand, travel through the proton exchange membrane to the cathode, where they react with a third chemical, usually oxygen, to create water vapor, which is typically exhausted as waste.

Another type of fuel cell is the solid oxide fuel cell (SOFC). Rather than a proton exchange membrane, the SOFC has a solid oxide or ceramic electrolyte. The solid oxide electrolyte conducts negative ions from the cathode to the anode, where the electrochemical oxidation of the oxygen ions with hydrogen occurs. Compared to PEM fuel cells, SOFC's can have higher efficiency, long-term stability, fuel flexibility, low emissions, and relatively low cost, in part because they do not include expensive platinum catalyst material. At the same time, SOFC's have higher operating temperatures than PEM fuel cells (typically between 500° C. and 1,000° C.), which results in longer start-up times, and they can experience degradation with repeated thermal cycling.

Fuel cells can theoretically work forward or backward. That is, they can operate to produce electricity from a given chemical reaction, or they can consume electricity to produce that chemical reaction. However, typical fuel cells, especially PEM fuel cells, are usually optimized for operating only in electricity generation mode, and are generally not built in such a way that they can be operated backwards. Recently, however, reversible solid oxide fuel cells (RSOFC's) have been developed that can produce electricity from hydrogen fuel, or produce hydrogen fuel from electricity.

Because of these features, RSOFC's are considered good candidates for powering and storing energy on micro-grids. Micro-grids are local power distribution systems designed to supply local energy generation for both grid and off-grid connected facilities and communities, enabling a localized energy source in cases of emergencies or unreliable traditional grid use. The high cost and energy security issues associated with importing fuel to isolated or "islanded" grids has led to a growing desire to generate power onsite with alternative and renewable energy technologies, while reducing facility costs of importing electrical power. Energy storage is desirable to balance the micro-grid and improve efficiency, reduce fuel consumption, and provide power in the event of power outages. In order to stabilize a local power grid with continuous power, an RSOFC system can operate in Fuel Cell mode to produce power when needed, using the stored hydrogen to produce energy for the grid. This can allow for grid stabilization and improvement to power plant system efficiency.

Recently, there has also been interest in the energy sector in RSOFC's for energy storage, where they can be used in conjunction with renewable energy generation sources, such as wind and solar generation. In power generation systems, such as wind and solar energy systems, excess power must be stored or it is lost. Current systems available for storing energy present a variety of drawbacks, but RSOFC systems present a potential improvement in this area. Theoretically, excess power generated in off-peak hours can be sent to an RSOFC system operating in electrolysis mode to produce $H_2$, which is compressed and stored in tanks. The $H_2$ can then be used later in the same RSOFC system operating in fuel cell mode to provide supplemental power to the grid during peak hours or when specifically needed.

Notably, full scale application of RSOFC systems as energy storage and grid-stabilization systems has not previously been done. Consequently, many of the actual features that are needed for real world application of RSOFC's for energy storage and power grid stabilization have not previously been developed.

In making the first applications of this kind, it has been found that one challenge presented by RSOFC energy storage systems relates to the steps involved in the change-over from fuel cell mode to electrolysis mode. Various aspects of RSOFC systems involve a delicate balance when transitioning the fuel cell unit between modes. For example, in order to avoid degradation of the solid oxide fuel cell materials, it is desirable to keep the RSOFC fuel cell unit properly heated and operating during a change-over from one mode to another, and during what may be termed degraded operating conditions of the RSOFC system. Additionally, during change-over intervals, it is desirable to safely control pressure and output of hydrogen gas, and to control the operation of the compressor for hydrogen storage. Determining when to send gas to the compressor, and how to transition the system based on commands from a power grid are also issues of concern.

The present disclosure is intended to address one or more of the above issues.

SUMMARY

It has been recognized that it would be desirable to have a Reversible Solid Oxide Fuel Cell (RSOFC) system that can maintain desired operating parameters of the solid oxide fuel cell unit during all operating conditions of the system.

It has also been recognized that it would be desirable to have an RSOFC system that is easily and safely changeable between energy generation and electrolysis states.

In accordance with one aspect thereof, the present disclosure provides a method for transitioning between fuel cell and electrolysis modes in a Reversible Solid Oxide Fuel Cell (RSOFC) system. In one embodiment the method includes measuring and recording sensor data indicating a status of components associated with a reversible solid oxide fuel cell (RSOFC) system coupled to an electrical power grid, the system comprising an RSOFC unit, a hydrogen compression system, a hydrogen storage system, and a water supply, determining a state of the RSOFC system based on the sensor data through a conditional logic algorithm, and transitioning the RSOFC system between the fuel cell mode and the electrolysis mode based upon the sensor data and the system state.

In accordance with another aspect thereof, the present disclosure provides a method for controlling a system having a Reversible Solid Oxide Fuel Cell (RSOFC) unit coupled to an electrical power grid. The method includes maintaining a heated state of an RSOFC unit coupled to an electrical power grid, transitioning to an electrolysis mode of the RSOFC unit based upon sensor data indicating that the electrical power grid has excess power and that a hydrogen storage system associated with the RSOFC unit has unused capacity, and transitioning to a fuel cell mode of the RSOFC unit based upon sensor data indicating that the electrical power grid presents power demand and the hydrogen compression and storage system has sufficient hydrogen fuel.

In accordance with yet another aspect thereof, the present disclosure provides a Reversible Solid Oxide Fuel Cell (RSOFC) system. The system includes a hydrogen fuel source, having elevated pressure, a water source, a hydrogen compressor, coupled to the hydrogen fuel source, an RSOFC unit, having a fuel cell mode and an electrolysis mode, coupled to the hydrogen fuel source, the water source, the hydrogen compressor, and to an electrical power grid, and a controller, coupled to the RSOFC unit, the hydrogen fuel source, the water source, the hydrogen compressor, and to the electrical power grid. The controller is configured to receive sensor data regarding the hydrogen fuel source, the water source, the hydrogen compressor, and the electrical power grid, determine a state of the RSOFC system using a conditional logic algorithm, and switch the RSOFC unit between the fuel cell mode and the electrolysis mode depending upon the state of the RSOFC system and a power surplus or power demand condition of the power grid.

Figure 1:
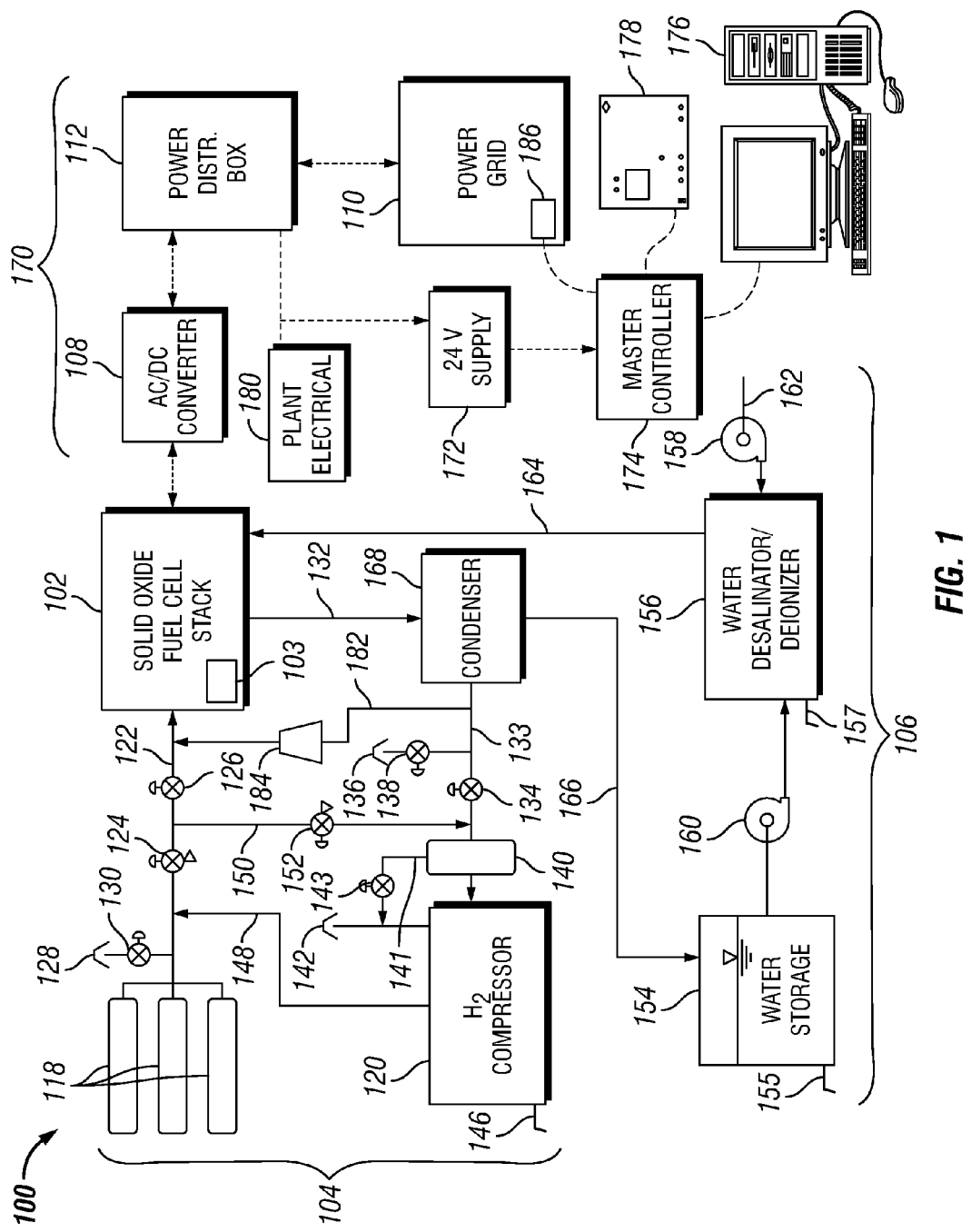
FIG. 1 is a schematic diagram of an embodiment of a Reversible Solid Oxide Fuel Cell (RSOFC) system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

As noted above, in power generation systems, such as wind and solar energy systems, excess power must be stored or it is lost. Current systems for storing energy include flywheels, batteries, pump hydroelectric and compressed air storage, for example. Each of these methods present drawbacks that suggest the desirability of RSOFC energy storage systems. However, full scale application of RSOFC systems as energy storage and grid-stabilization devices has not previously been done. In particular, it has been found that the change-over from fuel cell (or "FC") mode to electrolysis (or "EL") mode in an RSOFC system involves a delicate balance to avoid a variety of potentially undesirable situations. Dealing with these issues, as well as determining when to send gas to the compressor, and how to transition the system based on commands from a power grid are also issues of concern.

Advantageously, a system and method have been developed for safely transitioning an RSOFC system between electrolysis and fuel cell modes in response to energy availability and energy demands. Shown in FIG. 1 is a schematic diagram of an embodiment of a Reversible Solid Oxide Fuel Cell (RSOFC) energy storage system 100, configured in accordance with the present disclosure. The RSOFC system 100 acts as an energy storage device to store and supply energy to an electrical grid 110 based on the demand requirements from the grid, or commands from a grid network manager. When excess power is generated by the grid or the grid demands the RSOFC system to store energy, the RSOFC system can operate in electrolysis or EL mode to generate, compress, and store $H_2$ from the electrolysis of water. This is accomplished by applying power from the gird 110 to the RSOFC system 100, when operating in EL mode. When power is needed by the grid 110, the stored $H_2$ is fed to the RSOFC system 100 operating in fuel cell or FC mode to produce power for the grid.

Viewing FIG. 1, the system 100 generally includes an RSOFC unit 102 (also referred to as a "fuel cell stack" or "fuel cell unit" or "fuel cell subsystem"), which is connected to a hydrogen compression and storage system, indicated generally at 104, and a process water system, indicated generally at 106. The fuel cell unit 102 is electrically coupled to an AC/DC converter 108, which connects to the local power grid 110 through a power distribution box 112. The fuel cell subsystem 102 includes sensors, controls, etc. (not shown), and can include its own subsystem controller 103, which can interface with the system master controller 174, described below. Alternatively, the fuel cell subsystem 102 and its associated sensors, controls, etc. can interface directly with the master controller 174, allowing the master controller to directly control the fuel cell unit 102.

While a single fuel cell unit 102 is shown in FIG. 1, this is for illustrative purposes only. Those of skill in the art will recognize that multiple fuel cell units or stacks 102 can be electrically coupled together in parallel and/or series to provide the desired output voltage and current from the fuel cell system 100. The RSOFC unit 102 produces power from oxidation of stored hydrogen ($H_2$) from the hydrogen compression and storage system 104 when in fuel cell or FC mode, and generates hydrogen ($H_2$) through electrolysis of water from the process water system 106 when in electrolysis or EL mode. The reversible solid oxide fuel cell unit 102 includes various features that are not specifically shown, such as an anode vent and anode vent valve, a stack preheater, condenser, etc. These types of components are generally known, and will be appreciated by those of skill in the art.

The hydrogen compression and storage system 104 includes a group or array of hydrogen fuel storage tubes or cylinders 118 and a hydrogen compressor 120. The hydrogen fuel storage tanks 118 are configured to store hydrogen gas at high pressure, and are coupled to the fuel cell unit 102 via a hydrogen fuel line 122. As used herein, the terms "high pressure" or "elevated pressure" in reference to the hydrogen storage, means any pressure above about 250 psi. In one embodiment, the hydrogen fuel storage tanks 118 and the system 100 as a whole are designed to store hydrogen at a pressure above 1000 psi and more particularly up to about 2500 psi, but much higher pressures can also be used. For example, some hydrogen fuel cell systems store hydrogen at pressures of 10,000 psi and higher. The hydrogen fuel line 122 includes a pressure reducing valve 124 and a main hydrogen control valve 126. A high pressure hydrogen vent 128 and its associated valve 130 are also coupled to the hydrogen fuel line 122 to vent hydrogen gas in case of overpressure in the hydrogen fuel storage array 118. The pressure reducing valve 124 allows hydrogen gas to be provided from the hydrogen fuel storage array 118, which is at high pressure (e.g. 2500 psi), to the RSOFC unit 102 at lower pressure (e.g. 75 psi) when the RSOFC unit 102 is operating in fuel cell mode.

The compressor 120 is coupled to the RSOFC unit 102 via the fuel cell output line 132, which directs low pressure output from the fuel cell 102 through a condenser 168, which initially separates a significant quantity of water from the fuel cell output, and thence into a low pressure hydrogen line 133. The compressor 120 receives low pressure hydrogen gas as output from the RSOFC unit 102 via the low pressure hydrogen line 133 when the RSOFC unit 102 is operating in electrolysis mode. A hydrogen recycle line 182 connects the low pressure hydrogen line 133 to the hydrogen fuel line 122, and includes a hydrogen recycle blower 184. This hydrogen recycle line 182 is useful in fuel cell mode for pumping residual hydrogen back for consumption in the fuel cell unit 102. When operating in fuel cell mode, some residual amount of hydrogen gas may pass through the fuel cell 102 without reacting and producing electricity. This residual hydrogen will be separated from the water vapor in the fuel cell output line 132 by the condenser 168, and is returned to the hydrogen fuel line 122 by the hydrogen recycle blower 184. Disposed in the low pressure line 133 are a compressor suction valve 134 and a fuel cell exhaust vent 136 and fuel cell exhaust vent valve 138. A buffer tank 140 is also coupled in line with the low pressure line 133 near the intake of the compressor 120. The buffer tank 140 is fed $H_2$ generated by the fuel cell subsystem 102. The buffer tank 140 is coupled to the compressor suction vent 142 via a buffer tank vent line 141 and buffer tank vent valve 143. Pressure is monitored in the buffer tank 140 to ensure that pressure does not get too high or too low, since this could cause elevated operating pressure in the fuel cell subsystem 102, or, in the case of low pressure, create a vacuum that could draw air in if there is a leak.

The compressor 120 includes a compressor suction vent 142, along with a drain 146 for allowing drainage of water from the compressor condenser (not shown). The compressor 120 is configured to receive low pressure hydrogen gas produced from the electrolysis of water in the fuel cell 102, and compress this gas and provide it to the hydrogen fuel storage array 118 via the compressed hydrogen supply line 148. A compressor recycle line 150 is also connected between the hydrogen fuel line 122 and the low pressure line 132, with a compressor recycle line valve 152 therein. The compressor recycle line valve 152 can be a pressure reducing valve, since the pressure in the low pressure line 133 is generally below the pressure in the hydrogen fuel line 122. Alternatively, a separate pressure reducer (not shown) can be included in the compressor recycle line 150. This compressor recycle line 150 is coupled to the hydrogen fuel line 122 downstream of the pressure reducing valve 124, and allows low pressure hydrogen to be recycled through the compressor 120 if desired, rather than being fed to the fuel cell unit 102, as discussed in more detail below. Other features of the compressor 120, such as a condenser, cooler, etc., are not shown in FIG. 1, but will be appreciated by those of skill in the art.

The process water system 106 includes a water storage tank or reservoir 154 and a desalinator/deionizer unit 156, along with a water supply pump 158 and a process water pump 160. The water storage tank 154 can include a drain 155 for allowing the process water to be drained from the tank. The process water system 106 provides deionized water to the RSOFC unit 102, whether from the water storage tank 154 or the deionizer unit 156 or both, when the RSOFC unit 102 is operating in electrolysis mode, and can receive exhaust water from the RSOFC unit 102 when the RSOFC unit 102 is operating in fuel cell mode (water output from a fuel cell operating in fuel cell mode is naturally deionized). Deionized water is desired for electrolysis in order to avoid the introduction of minerals and chemical species that can interfere with the electrolytic reactions of the fuel cell unit 102 or degrade its condition.

The deionizer unit 156 can be connected, as indicated at 162, to any suitable water supply, such as a local municipal potable water distribution system, or even to a sea water intake. The deionizer unit 156 can be configured to remove salt from the water through a multistep process of reverse osmosis, followed by a deionization step to further purify the water. Where the water supply is a potable water source, the process can involve only the deionization step. A sensor (not shown) can be placed on the exit of the deionizer unit 156 to measure the conductivity of the water, to determine the completeness of deionization and its suitability for use in the RSOFC unit 102. A drain 157 can be provided for drainage of brackish water from the deionizer unit 156.

The process water system 106 is coupled to the fuel cell unit 102 through the process water pump 160 via a water supply line 164 and a water return line 166, which can return water from the condenser 168 to the water storage tank 154. With this configuration, the RSOFC system 100 can be a closed-loop system, retaining and recycling process water whether operating in electrolysis or fuel cell mode. In fuel cell mode, water exhaust produced in the fuel cell unit 102 can be condensed by the condenser 168 and returned to the water storage tank 154 via the water return line 166. In electrolysis mode, process water can be drawn from the water storage tank 154 and/or the deionizer unit 156 and pumped via the process water pump 160 to the fuel cell unit 102, where the water is split into hydrogen, which is compressed and stored, and oxygen, which is exhausted to the atmosphere. Alternatively, the RSOFC system 100 can be an open-loop system, exhausting water vapor to the atmosphere when operating in fuel cell mode, and drawing water from the process water system 106 as needed when operating in electrolysis mode. In electrolysis mode, the condenser 168 acts as a heat exchanger, reducing the fuel cell exhaust temperature (e.g. from about 250° C. to about 40° C.) so that inlet temperatures for the anode recycle blower and the compressor are in a desired range. In this process, water is condensed out of the output stream, and this water is returned to the water storage reservoir 154 via the water return line 166.

The RSOFC 100 also includes an electrical subsystem, indicated generally at 170. The electrical subsystem includes the AC/DC converter 108, the power distribution box 112, as well as a connection from the power distribution box 112 to a 24 volt DC power supply 172 for powering electrical subsystems of the RSOFC system 100, including a master controller 174, and a connection to supply power to the plant electrical subsystems 180, sometimes also referred to as the "balance of plant" electrical. As noted above, the fuel cell unit 102 is electrically coupled to the local power grid 110 through the power distribution box 112. The AC/DC converter 108 is a bi-directional converter that converts DC output from the fuel cell unit 102 into grid power (e.g. 3 phase—4 wire, 480 VAC 60 Hz) for transmission into the power grid 110 when the fuel cell unit 102 is operating in fuel cell mode. Conversely, the AC/DC converter 108 also converts AC input from the power grid 110 into DC input for the fuel cell unit 102 when it is operating in electrolysis mode. The electrical subsystem 170 can also include other elements, such as a transformer (not shown) to convert grid power to 110V AC for utilities use, a ground fault detector (not shown) to measure any leakage current for the entire power distribution box 112, current sensors (not shown) for reading the current being drawn by each individual load, including total parallel current for all AC/DC loads, and a line monitor (not shown), which measures voltage on the electrical line connecting the RSOFC system 100 to the power grid 110, to read both grid voltage and current. The power grid 110 can include a grid controller 186, which is coupled (e.g. via Ethernet, Internet, wireless connection, etc.) to the master controller 174 and provides signals indicating a power demand or power surplus condition of the grid 110. When the grid 110 demands power, the master controller 174 can cause the system 100 to enter fuel cell mode, and produce power for the grid 110, so long as it has a suitable fuel supply. Conversely, when the grid 110 has a surplus of power, the master controller 174 receives a signal from the grid controller 186 indicating this, and causes the system 100 to enter electrolysis mode to produce and store hydrogen gas.

The power grid 110 can also include grid-coupled solar, wind or other renewable energy generation systems. The RSOFC unit 102 can thus receive electricity from these renewable energy generation systems when operating in electrolysis mode, thus allowing the system 100 to store excess energy that is generated from these variable and intermittent sources. It is to be understood that wind and solar generation systems are only two examples of many types of energy input sources that could be coupled to the RSOFC system 100 through the grid 110. Those of skill in the art will recognize that there are other energy input sources that could be associated with the RSOFC system 100.

The master controller 174 is a microprocessor device, having a processor and system memory, and provided with suitable software for monitoring and controlling all of the systems and connections of the RSOFC system 100. The master controller can include or be coupled to a computer terminal 176 and/or a control panel 178 for allowing user input and monitoring.

The RSOFC system 100 also includes a variety of sensors (not shown) that are either associated directly with various components of the RSOFC system 100, or are associated with fluid conduits, valves, electrical connections, etc. These sensors are coupled to provide sensor data (e.g. via wired electrical connections) to the master controller 174. For example, the hydrogen fuel line 122, the low pressure hydrogen line 133, the compressed hydrogen supply line 148 and any other components that handle the storage or transmission of hydrogen can include sensors for pressure, temperature, flow rate, hydrogen presence, water content, etc. Pressure in the hydrogen storage tanks 118 and downstream regulated pressure can be monitored, and values can be sent to the master controller 174. Other sensors can be associated with the various valves to provide indications of valve state (e.g. open or closed). Similarly, pressure, temperature and flow sensors, as well as pump operating sensors can also be associated with each component of the process water system 106.

Electrical sensors and switches (not shown) can also be associated with the AC/DC converter 108 and the power distribution box 112 and their related electrical connections, both internally and with the power grid 110, to allow the master controller to receive input signals related to the conditions of the electrical subsystem 170 and the control system of the power grid 110. The master controller 174 is thus coupled to all components of the RSOFC system 100 and can control the modes of the RSFOC unit 102 and the related devices (e.g. the hydrogen compression and storage system 104 and the process water system 106) based on sensor data.

The RSOFC system 100 can also include a variety of other subsystems that are not specifically shown in FIG. 1, but can be included for control and operation, and will be familiar to those of skill in the art. For example, the various valves of the RSOFC system 100 can be power actuated valves, allowing remote control and monitoring of their state. For example, these can be pneumatically actuated valves, and the system 100 can include a compressed air subsystem (not shown) for providing power for actuating all of these valves in response to electrical control signals from the master controller 174. The compressed air pressure can be measured and monitored at the output of the air compressor (not shown) in order to be maintained higher than some desired working pressure, such as 80 psi.

The RSOFC system 100 can also include a flammable gas detection system (not shown) that includes multiple sensors to monitor for a combustible environment that could occur in the event of a leak of hydrogen. Sensor signals from the flammable gas detection system can be transmitted to the master controller 174, which analyzes these signals for any indication of a combustible environment.

The RSOFC system 100 can also include a thermal management system (not shown) that is configured to supply cooling water to the $H_2$ compressor and to the fuel cell unit 102 for its condenser. This cooling water system can be designed to supply an inlet temperature of about 25° C. and about 30 psi pressure to each system, for example.

Advantageously, the RSOFC system 100 shown in FIG. 1 can be scaled up or down as needed for a given location and application. It has been suggested, for example, that this type of system can be provided in a modular form in a standard size shipping container or the like, so that it can be easily transported to any location where it is to be used.

The various sensors of the RSOFC system 100 indicate the status of the various components of the system, and, based on the sensor input, the master controller 174 can determine a state of the RSOFC system 100 by applying a conditional logic algorithm. The operation of the conditional logic is outlined in the various flow charts included in FIGS. 3-9 and described in more detail below. The master controller 174 can thus transition the RSOFC system between the fuel cell mode and the electrolysis mode based upon the sensor data and the system state. The result is an energy storage system that converts excess energy into hydrogen when in electrolysis mode, and compresses that gas for later use. In order to stabilize the power grid 110 with continuous power, the RSFOC system 100 can then switch to fuel cell mode and use the stored hydrogen to produce energy for the grid 110. The master controller 174 can thus control and orchestrate the various modes of the RSOFC system 100 to help ensure that power output meets the demand for power, and that excess power is not lost.

Figure 2:
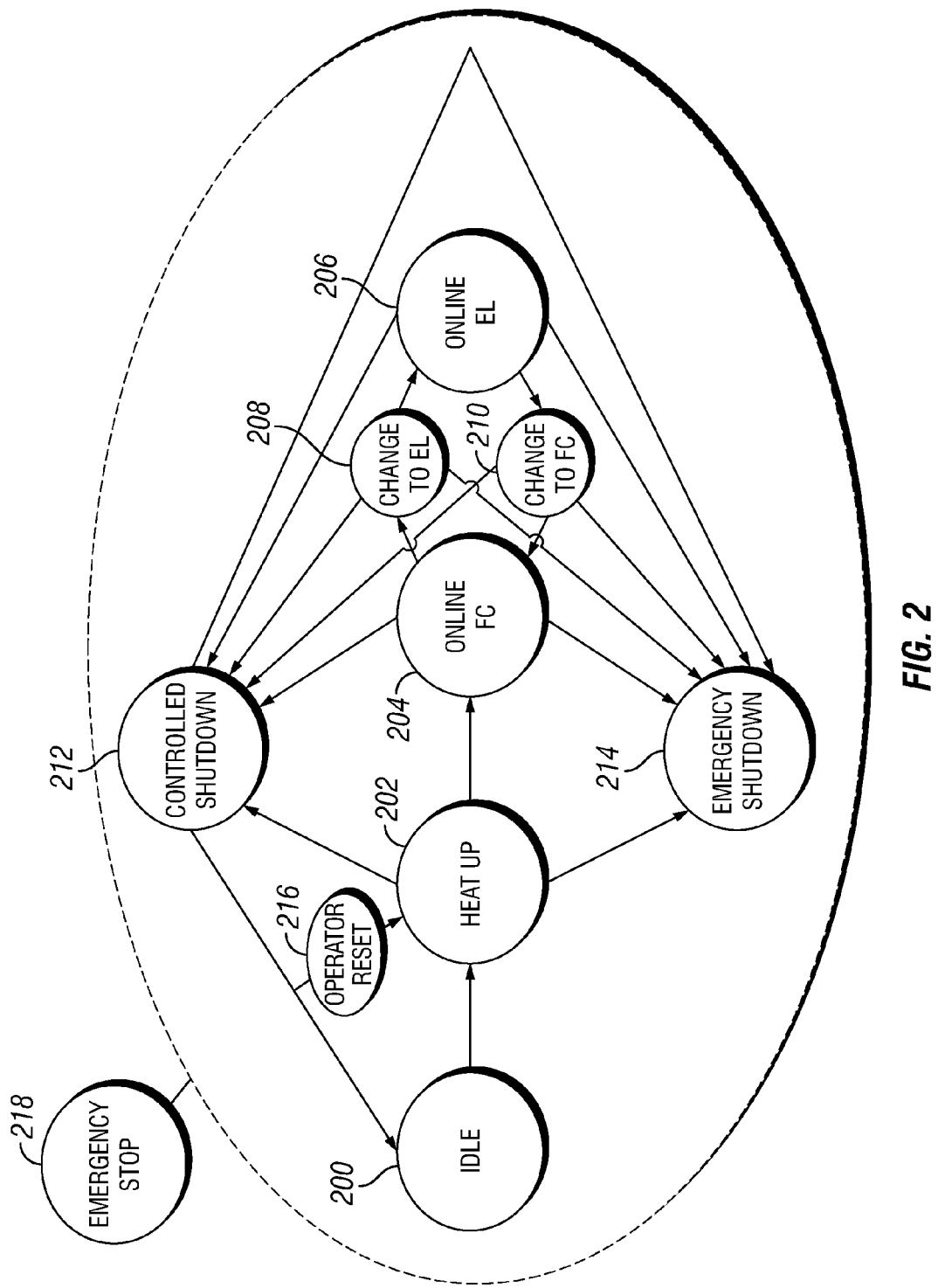
FIG. 2 is a mode transition diagram for an RSOFC system like that of FIG. 1.

As noted above, the master controller 174 interfaces with the control system of the power grid 110 and the various subsystems of the RSOFC system 100 to determine mode transition and status of the overall system. Shown in FIG. 2 is a mode transition diagram for an RSOFC system like that of FIG. 1. The RSOFC system 100 has four general operational modes, which are idle mode 200, heat up mode 202, online FC mode 204 and online EL mode 206. Generally, the master controller (174 in FIG. 1) can place the system in FC (fuel cell) mode 204 or EL (electrolysis) mode 206 based on the commands or power requirements from the grid 110. Between the power generation mode 204 and hydrogen generation mode 206 are two changeover modes—a changeover from fuel cell (FC) to electrolysis (EL) mode 208, and a changeover from electrolysis (EL) mode to fuel cell (FC) mode 210.

At any time during operation in heat up mode 202, online FC mode 204, online EL mode 206, or during the changeover modes 208 and 210, the system can be prompted (e.g. by an operator or through programmed operation by the master controller 174) into a controlled shutdown mode 212, in which the system will return to idle mode 200 or await an operator reset signal 216. In controlled shutdown mode 212 the master controller leaves the coolant pump ON in order to provide the necessary cooling to the system. A list of measurements are recorded and monitored. All subsystems follow their own controlled shutdown protocol and send confirmation to the master controller that controlled shutdown mode 212 has been successfully entered. The system can enter idle mode 200 when the fuel cell subsystem has indicated it has completed its controlled shutdown. When returned to Idle, the pump is turned off and all valves are returned to their fail safe mode.

Alternatively, at any time during operation in the above-mentioned modes, the system can be prompted by the master controller 174 into an emergency shutdown mode 214. An emergency shutdown is an immediate shutdown of the system due to an operational failure. Emergency shutdown 214 can be initiated in response to a variety of situations, such as a signal indicating a combustible environment (i.e. a hydrogen leak), a failure of a subsystem of the RSOFC system 100, etc. In one embodiment, emergency shutdown only occurs if there is an electrical ground fault detected or a combustible gas sensor (not shown) detects gas concentrations at some level relative to a combustibility limit (e.g. sensing combustible gasses at 50% of a lower explosion limit). After the system enters emergency shutdown mode 214, the system remains in this mode until the fuel cell indicates that it is "shutdown," and until the operator manually resets the system. The operator cannot reset the system until the fuel cell is "shutdown." At this point the system can go into idle mode 200. The Emergency Shutdown mode 216 occurs when there is a catastrophic operational failure to one of the RSOFC subsystems. In such a situation, all equipment is turned off and placed into fail safe mode. All valves are de-energized, and pumps are turned off. Advantageously, the system is designed to fail safe. However, in emergency shutdown mode 214, selected sensors will remain online to allow monitoring, while the other subsystems of the RSOFC system 100 are shut down. The sensor systems remain online to monitor components of the system.

Further, the conditional logic algorithm of the master controller 174 or activation of an Emergency-Stop button (not shown) by an operator can shift the system into emergency stop mode 218 at any time. The emergency stop button opens the main circuit breaker to the RSOFC system 100, thus cutting all power to the system, including power to sensors, etc. In order to restart the system after an emergency stop, the main breaker is first closed to restore power, and the system startup procedures outlined in FIG. 3 are then commenced.

As indicated above, the primary function of the master controller 174 is to orchestrate the operation of the subsystems of the RSOFC system 100 to provide and store electrical power for the grid 110. The master controller 174 receives sensor inputs from the various subsystems, and, based on these input values, the conditional logic algorithm of the master controller will instruct the RSOFC subsystems to enter the appropriate mode, and/or to transition from one mode to another. It has been found that substantial care is desirable when switching between fuel cell (SOFC) and electrolysis (SOEC) modes. That is, the FC to EL and EL to FC changeover modes 208, 210 warrant significant control to avoid certain undesirable conditions. For example, it is desirable to remove excess water and/or hydrogen from the system before the FC to EL transition occurs, since this transition involves going from a high $H_2$ concentration to a high water concentration. Accordingly, in Changeover FC to EL mode 208 the master controller 174 reads an array of measurements from the sensor data until the system is ready to switch to EL mode 206. This process is shown and described below with respect to FIG. 7. The conditional logic control algorithm embedded in the system master controller 174 looks at system parameters and states along with micro-grid commands to determine when and what transition should occur.

Figure 3:
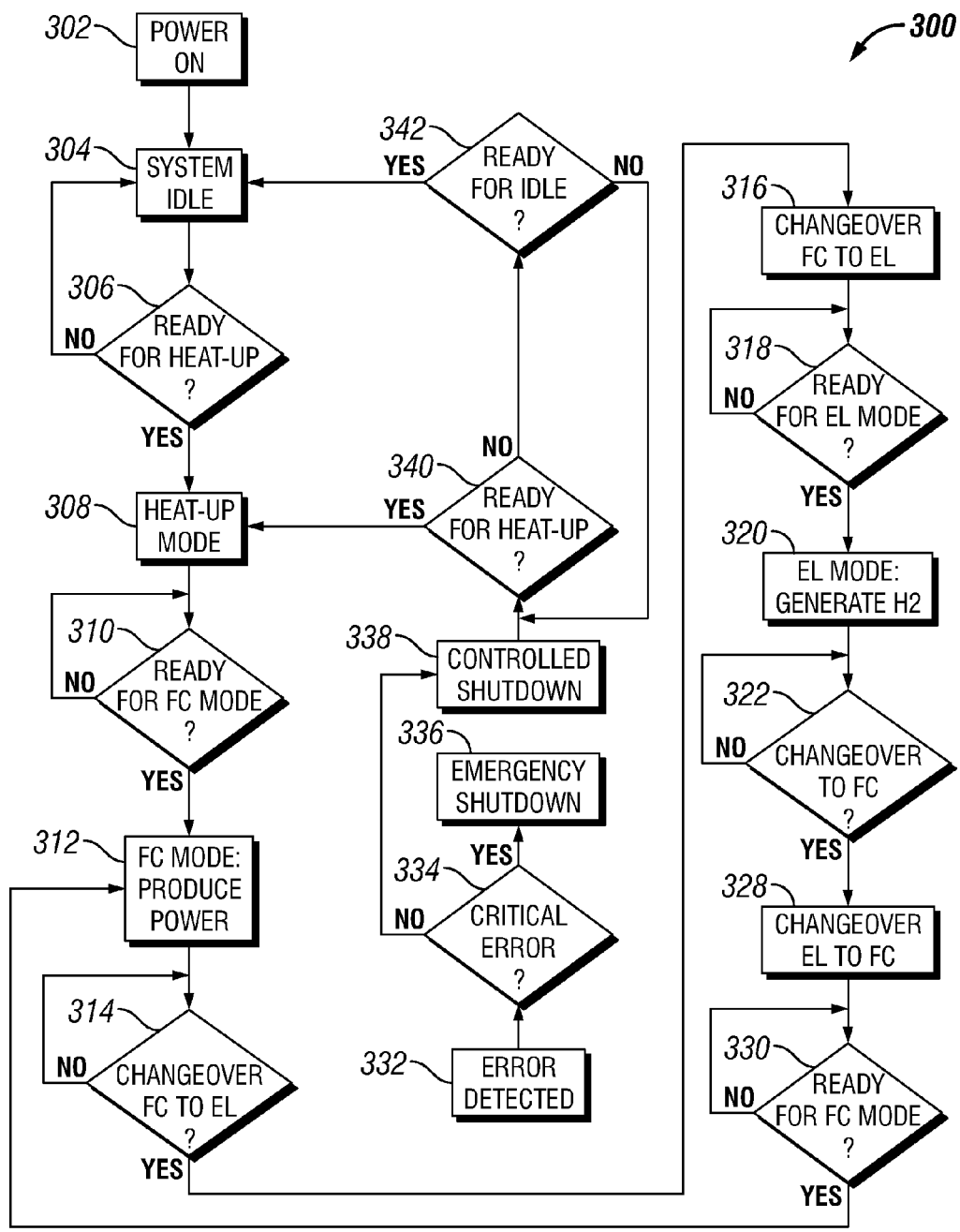
FIG. 3 is a high level flowchart of an embodiment of a method for controlling an RSOFC system in accordance with the present disclosure.

Provided in FIG. 3 is a high level flowchart showing one embodiment of an operational method, indicated generally at 300, by which the master controller 174 controls the RSOFC system 100. As shown in FIG. 2 and discussed above, the RSOFC system 100 has four basic operational modes, which are also shown in FIG. 3. These modes include an idle mode 304, a heat up mode 308, online FC mode 312, and online EL mode 320. There are also two changeover modes: a changeover FC (fuel cell) to EL (electrolysis) mode 316, and a changeover EL to FC Mode 328.

After system start, indicated at block 302, the next step is to enter idle mode 304 until the fuel cell is ready for heat up, as indicated at block 306. The system remains in idle mode until the fuel cell is ready for heat up, as indicated at block 306. When the system is ready, as determined by the master controller 174, it enters heat up mode 308, during which the fuel cell stack is heated to its desired operating temperature range. Until the desired temperature has been achieved and other sensors indicate the fuel cell is ready, as indicated at block 310, the system does not move forward. Once these conditions are met, the system enters FC (fuel cell—power generation) mode 312.

The system remains in FC mode 312 until the grid indicates that power is not needed, or the $H_2$ supply is indicated to be too low for continued fuel cell mode, as indicated at block 314. When these latter indications are received, the system shifts to a first changeover mode—change over FC to EL 316, which involves system adjustments to allow transition from producing power from the fuel cell to consuming power and generating hydrogen. The changeover FC to EL mode continues until the master controller determines that the RSOFC is ready for online EL (electrolysis) mode (or, where there is a separate controller 103 for the fuel cell subsystem 102, until the controller 103 of the fuel cell unit 102 signals the master controller 174 that it is ready for electrolysis mode), as indicated at block 318. Once these conditions are met, the system enter EL mode, block 320, and generates and stores hydrogen.

Figure 7:
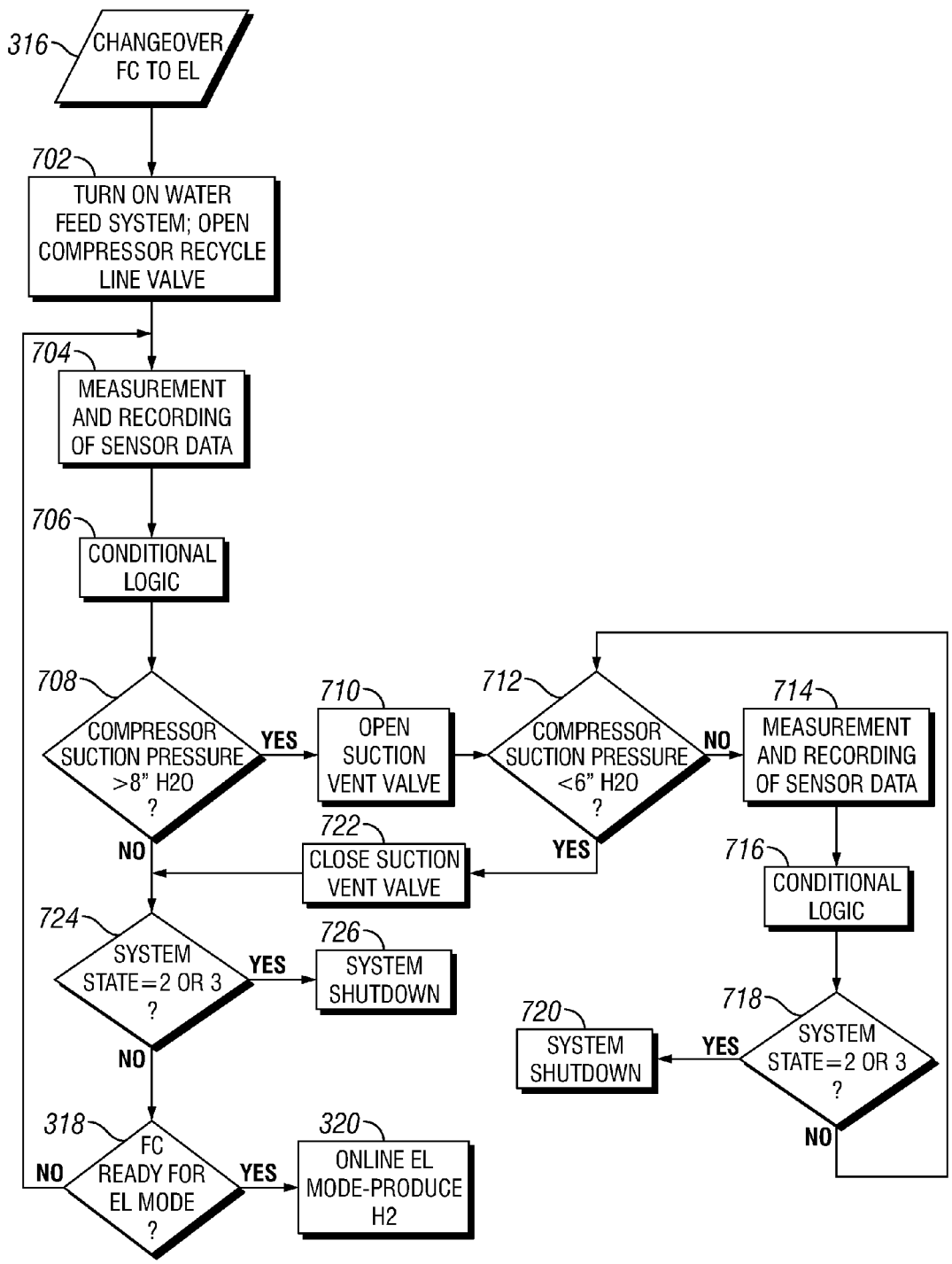
FIG. 7 is a flowchart showing steps in an embodiment of the process for changing over from fuel cell to electrolysis mode, as shown in FIG. 3.

When the system changes from fuel cell (FC) mode to electrolysis (EL) mode (316 in FIG. 3; FIG. 7), hydrogen gas is redirected from a condition in which it is vented to atmosphere, to a condition in which it feeds the compressor 120. This is accomplished by closing the vent valve 138 and opening the compressor suction valve 134. When the compressor 120 is on, a desired suction pressure is maintained in the buffer tank 140 (e.g. ~0.2 psi). Pressure control via this configuration of the buffer tank 140 and related structures ultimately sets the fuel cell system back pressure, Which is an advantageous control aspect for the integrated RSOFC system 100.

In Change over FC to EL mode 316 the starting pressure in the low pressure line 133 feeding the $H_2$ compressor 120 is subject to a specific control method that insures that the line pressure is prepared for transitioning the product gas from the fuel cell 102 and setting the fuel cell system operating pressure. In changeover FC to EL mode 316, the compressor recycle line valve 152 is opened to set the pressure in the low pressure line 133. In the event there is a higher than desired pressure, the buffer tank vent valve 143 can be opened to purge the gas until the desired pressure set point is reached. This prevents shocking the fuel cell unit 102 during transition to feeding the $H_2$ compressor, and helps ensure that air is not sucked into the compressor 120 due to a resulting negative pressure when the compressor is initially turned on.

Another advantageous control capability for the RSOFC system 100 is its ability to keep the fuel cell 102 "online" in the event there is a failure in the compression system 120. Thermal cycling of the fuel cell 102 can cause accelerated degradation of its components, and it is thus desirable to keep the system "hot." Advantageously, the present system implements a "vent" strategy in which certain alarms will shut down the compressor 120, and switch the vent valve 138 and compressor suction valve 134 to positions allowing the gas to vent through the fuel cell exhaust vent 136, as done in FC-EL mode 316. In this condition $H_2$ is still being produced, but the fuel cell unit 102 will remain hot until the alarm-inducing condition can be resolved. Once any fault is remedied, an operator reset will allow the system 100 to resume compressing $H_2$ gas. The process to maintain proper line pressure in the low pressure line 133, discussed above, is also implemented in this condition.

The EL mode 320 can continue until the hydrogen storage array (118 in FIG. 1) is full. Once the hydrogen storage array is full, the master controller determines whether the system is ready to transition from EL to FC mode, as indicated at block 322. This determination can be based on factors such as whether the power grid is indicating a demand for power. If neither of these conditions apply, the master controller can open a system vent (e.g. the exhaust vent 136 in FIG. 1), and the system can continue to produce hydrogen until one of those two conditions change. If power is not needed and the hydrogen storage array 118 is full, the system can remain in this mode as long as desired. However, there is usually a demand for power in the grid, and thus this condition is not likely to persist for a long period of time. Additionally, the system can enter this vent state if some fault of the compressor is detected, and the system is not yet ready to changeover to fuel cell mode.

Once the power grid indicates a demand for power, the system shifts to a second changeover mode—change over EL to FC 328, which involves system adjustments to allow transition from consuming power and generating hydrogen back to producing power by the fuel cell. The system remains in this changeover mode 328 until the master controller determines that the fuel cell is again ready to enter fuel cell (FC) mode (e.g. based on whether the fuel cell is in proper operating condition), as indicated at block 330, after which the system can return to FC (fuel cell—power generation) mode 312.

Throughout operation of the process shown in FIG. 3, the master controller 174 continually receives sensor input and evaluates the system condition. At any point, if an error or degraded condition is detected, the system can react in a variety of ways. When an error is detected, as indicated at 332, the master controller determines, based upon its programming, the severity of the error, as indicated at 334. If the error is a critical error, such as an electrical ground fault or detection of combustible gas above some threshold level, the system can proceed directly to the emergency shutdown stage 336, which terminates operation of the system, as discussed above with respect to FIG. 2. However, if the error is not one requiring an emergency shutdown, but is more than a minor error that merely produces an alarm indication, the system can proceed to a controlled shutdown 338.

Following controlled shutdown 338, the system remains ready for reset, either to the idle mode 304 or to the heat-up mode 308. Specifically, the master controller inquires at block 340 whether the fuel cell system is ready to re-enter heat-up mode. If so, the system proceeds to heat-up mode 308. If not, the master controller next considers whether the system is ready to enter idle mode 306, and transitions to that mode if the answer to the query at block 342 is affirmative. However, if the answers to both of these queries are negative, the system can repeat this series of inquiries until one or the other turns positive, or until some programmed limit is reached.

Figure 4:
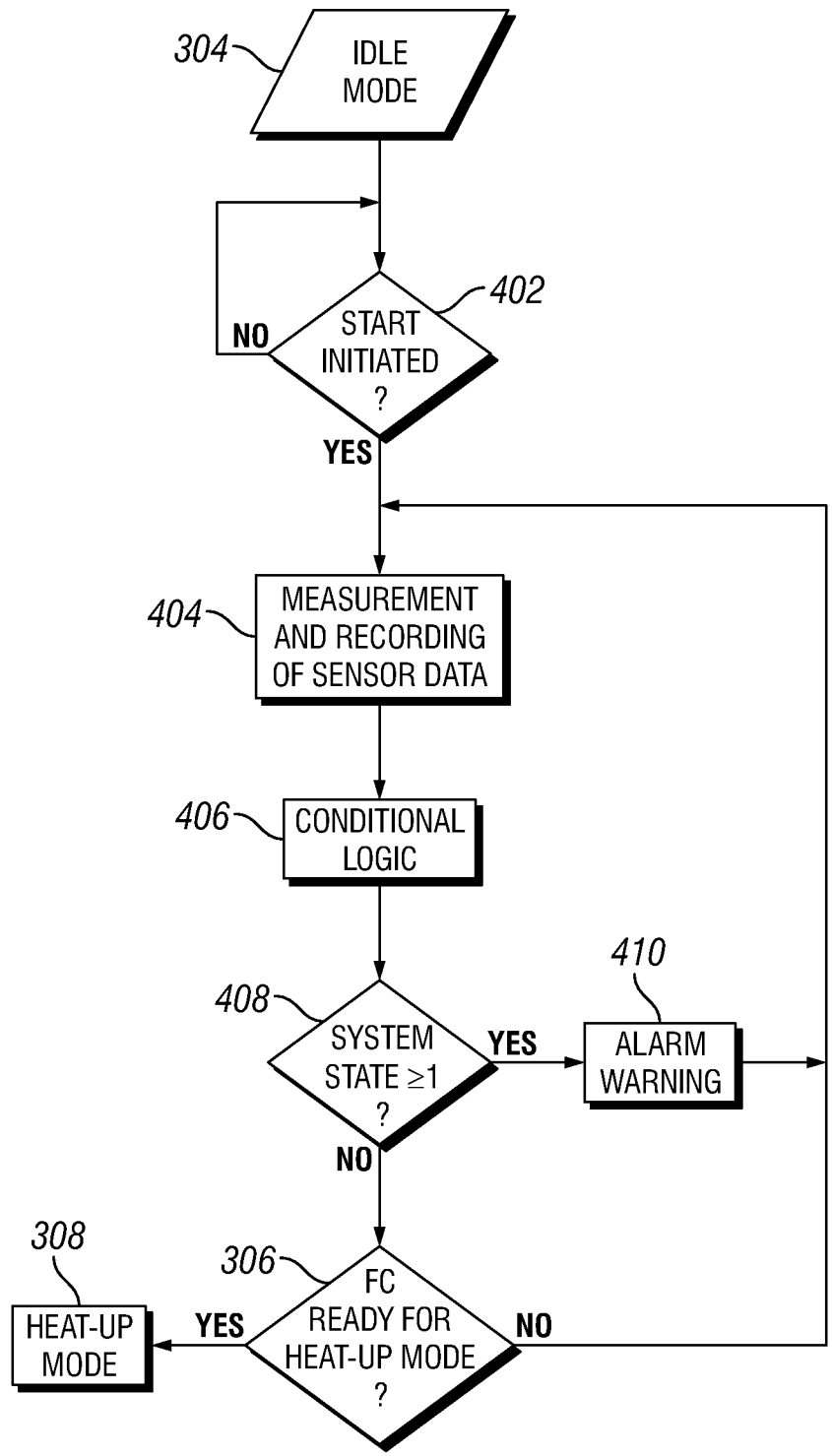
FIG. 4 is a flowchart showing steps in an embodiment of the process for instituting idle mode, as shown in FIG. 3.

Shown in FIGS. 4-9 are more detailed flowcharts of the major modes of the system, showing how the system changes from one mode to another using the conditional logic algorithm. A flowchart showing steps in an embodiment of the process for transitioning from idle mode 302 to heat-up mode 308 is shown in FIG. 4. The master controller is placed into idle mode 302 when the system is initially turned on, after completion of a controlled shutdown, or operator reset following an Emergency Shutdown. The system remains in this state until a Heat Up request is given through system start up. This is the start initiated step 402. At this point, all valves are in their respective NO/NC positions, and all pumps/motors, etc are turned off. When this start initiated command 402 is given, sensor data is measured and recorded at step 404, and the conditional logic algorithm is applied at step 406 to this sensor data to determine the state of the RSOFC system 100.

As presented in FIGS. 4-9, the state of the RSOFC system 100 is judged according to a four level operational state indicator. State 0 (zero) is considered "normal," and indicates that all subsystems are operating in an acceptable range. State 1 (one) is denoted as "degraded," which indicates that the system is operable, but at least one subsystem is not at a desired operational level. The master controller 174 is programmed so that detection of system state 1 will trigger an alarm to alert an operator to the degraded portion of the system. State 2 (two) is "failed non-critical," which means that the system is not operable, but is not in a dangerous condition. When state 2 is detected by the master controller 174, the alarm will sound, and the system will switch to controlled shutdown mode (212 in FIG. 2). State 3 is "failed critical," which indicates that the system is not operable, and may have entered or be susceptible of entering a dangerous condition. When state 3 is detected, the alarm will sound, and the system will immediately switch to emergency shutdown mode (214 in FIG. 2). It is to be appreciated that the four-level state evaluation system described herein is just one of many possible options for this purpose. The selection of this particular four-level state evaluation system and the given names of the system states are somewhat arbitrary. Those of skill in the art will recognize that many other methods for evaluating and denoting the state of the RSOFC system 100 could be chosen to accomplish the same purposes and functions outlined herein, and the system described herein is not limited to this particular embodiment.

Referring back to FIG. 4, after the conditional logic algorithm is applied to the sensor data at step 406, the software of the master controller 174 will determine the operational state of the RSOFC system 100 according to the four level operational state indicator series discussed above. If at this point the system state is equal to or above 1, as determined at step 408, the alarm warning 410 will sound, and the sequence will revert back to repeat the measurement and recording of sensor data step 404. Since at this point in the process the system has not yet heated up or started operation, a controlled shutdown (212 in FIG. 2; 338 in FIG. 3) or emergency shutdown (214 in FIG. 2; 336 in FIG. 3) is not yet relevant. If at step 408 the system state is not state 1, 2 or 3 (i.e. it is state 0), the process moves to step 306 at which the readiness of the system for heat-up mode is considered. If the system is in state 0 but not ready for heat up, the sequence will likewise revert back to repeat the measurement and recording of sensor data step 404. If, on the other hand, the system is ready for heat-up, as determined at step 306, the system will enter heat-up mode 308.

Figure 5:
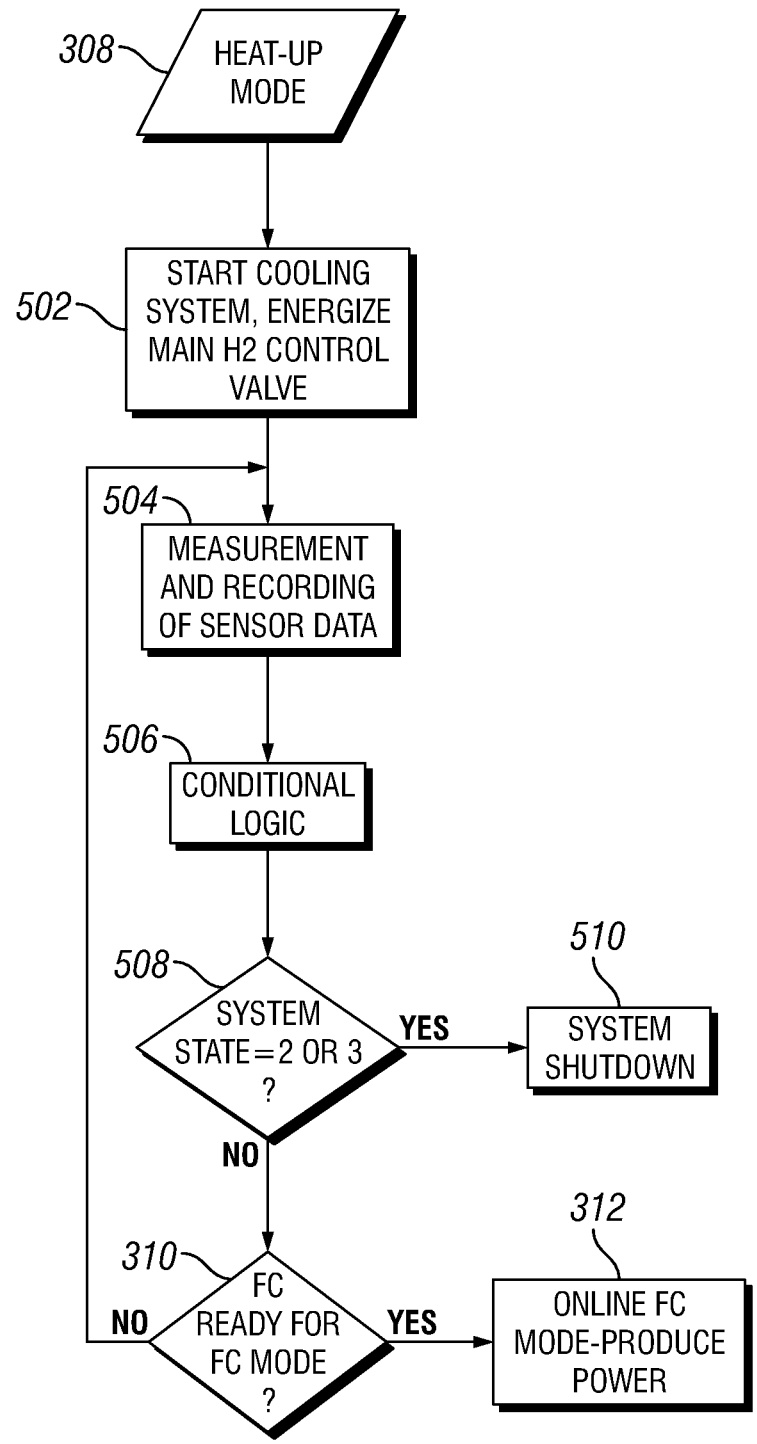
FIG. 5 is a flowchart showing steps in an embodiment of the process for instituting heat up mode, as shown in FIG. 3.
Figure 6:
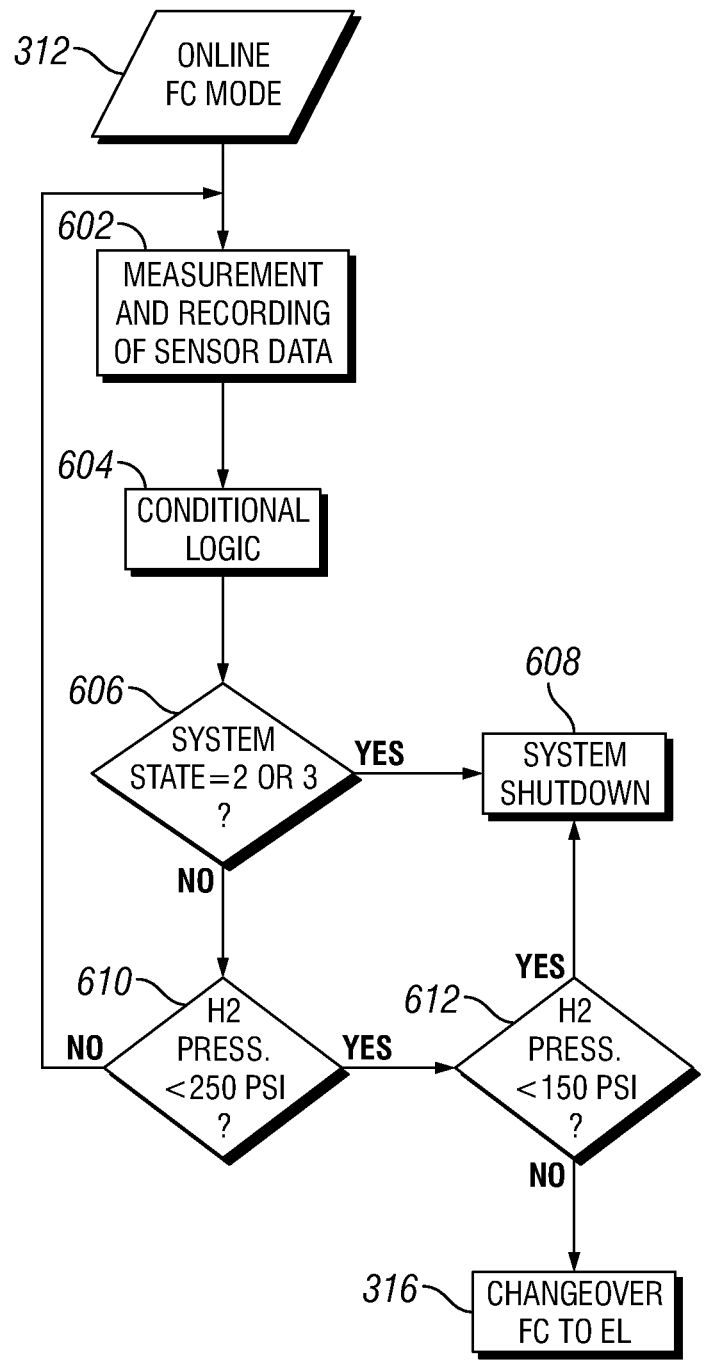
FIG. 6 is a flowchart showing steps in operation in fuel cell mode, as shown in FIG. 3.

When the RSOFC unit 102 reaches its operational temperature in heat up mode 308, it will signal the master controller 174 to switch to FC mode. The process steps involved in this are shown in FIG. 5. Upon entry into "heat up" mode 308 the master controller 174 first turns on the cooling system (not shown), and opens the main H$_2$ control valve (126 in FIG. 1), as indicated at 502. At this point the measurement and recording of sensor data 504 is again performed, and the conditional logic 506 is applied to the system. The application of the conditional logic allows the master controller 174 to again determine the state of the system at step 508. If the system is at state 2 or 3, the master controller will initiate a system shutdown 510, and the process will stop. This will be the case any time the system state is evaluated and found to be a state 2 or 3. The system shutdown may be a controlled shutdown (212 in FIG. 2; 338, FIG. 3) if the system state is state 2, or it may be an emergency shutdown (214 in FIG. 2; 336, FIG. 3) if the system state is state 3. Though not shown in FIGS. 5-9, any time the master controller performs the system state evaluation (e.g. step 508) and determines that the system state is state 1, an operator alarm will be activated, but the respective process will continue as when the state is state 0. These alarm steps are not shown in FIGS. 5-9, but are to be understood to apply at each system state evaluation step.

If the system state is 0 or 1, as determined at step 508, the master controller then determines whether the system is ready to enter FC (fuel cell) mode at step 310. If not, the process will revert back to repeat the measurement and recording of sensor data step 504. On the other hand, if all system parameters are within desired limits at step 310, the system will enter online FC mode 312.

When the master controller 174 receives confirmation, whether directly from the fuel cell 102 or from the fuel cell subsystem controller 103, if present, that the fuel cell system 100 is ready for FC mode 312, it commands all subsystems to go into "online FC" mode 312. While in this mode, the steps shown in FIG. 6 will apply. In general, the master controller will read an array of measurements, store and analyzes the data, and determine whether any anomalies are present in the overall system. More specifically, the measurement and recording of sensor data 602 is performed, and the conditional logic 604 is applied to the system in the manner discussed above. If the system is at state 2 or 3 as determined at evaluation step 606, the master controller will initiate a system shutdown 608, and the process will stop. With this process, if at any time during operation in FC mode certain faults are encountered that mandate a "controlled shutdown" or "emergency shutdown" (as shown at 332 in FIG. 3), the master controller will orchestrate and command all subsystems to enter such a mode.

On the other hand, if the system state is acceptable (state 0 or 1) the master controller will then consider the pressure in the hydrogen storage array (118 in FIG. 1). If the hydrogen pressure in the hydrogen storage array is below a first minimum threshold pressure, such as 250 psi, this will indicate a low hydrogen supply, indicating that fuel cell mode should be discontinued. Thus, the system considers at block 610 whether the hydrogen pressure is below the first low threshold. If not, the process will revert back to the measurement and recording of sensor data step 602, and repeat the process. In this way, the measuring and recording of sensor data 602, the application of the conditional logic algorithm 604 and the evaluation of the system state 606 and hydrogen storage pressure 314 will be continuously repeated so long as the system is in FC mode. If all measurements indicate a "normal" system, fuel cell operation and monitoring and storing of data will continue. If at any time the system state degrades to state 2 or 3 (block 606), a system shutdown 608 will be ordered. Otherwise, FC mode 312 will continue so long as the hydrogen supply is sufficient.

When the hydrogen pressure drops below the first low threshold, such as 250 psig, as indicated at block 610, but not below a second low threshold, such as 150 psig, as indicated at block 612, the master controller can switch the RSOFC system into a first changeover or transition mode, which is changeover from FC (fuel cell) to EL (electrolysis) mode 316. Alternatively, if when measured at block 612 the hydrogen pressure is found to have dropped below the second low threshold, the system can be programmed to go to system shutdown 608. This can be a controlled shutdown or an emergency shutdown, as discussed above. Such a pressure drop can indicate a leak or other undesirable condition, for example, thus warranting a system shutdown.

The steps involved in changeover from FC to EL 316 are shown in FIG. 7. The main function of this mode is to transition the fuel cell system from fuel cell to electrolysis mode. In "Change Over FC to EL" Mode 316 the Master Controller commands the fuel cell 102 and all other subsystems to enter "Change Over FC to EL" mode. When the changeover from fuel cell to electrolysis mode 316 is indicated, the first step, indicated at block 702, is to activate the process water system (106 in FIG. 1) to provide process water to the fuel cell stack (102 in FIG. 1), and open the compressor recycle line valve (152 in FIG. 1). In this mode the Master Controller reads an array of measurements, stores, and utilizes the readings to determine the overall condition of the entire system. If any of the sensors' readings are out of range the Master Controller will command the rest of the subsystems to enter the appropriate mode. Specifically, the next steps are the measurement and recording of sensor data 704 and the application of conditional logic 706 by the master controller, in the manner discussed above. Ultimately, the changeover from FC to EL 316 involves determining the system state at 724, commanding a system shutdown 726 if the system state is a 2 or 3, and otherwise querying whether the fuel cell is ready for EL (electrolysis) mode 318. If so, the system enters EL mode to produce hydrogen, as indicated at block 320. In this mode the fuel cell 102 will produce hydrogen from the process water of the process water system 106 and using electricity delivered from the power grid 110, and this hydrogen will be compressed by the compressor 120 and stored in the hydrogen storage array 118.

However, the changeover from FC to EL process 316 involves some additional steps beyond the system state query at block 724. Namely, the system also checks the compressor suction pressure at block 708. This pressure check is to determine the intake suction pressure of the hydrogen compressor (120 in FIG. 1) and is measured at the buffer tank 140. For operation of the hydrogen compressor 120, it is desired that the compressor intake have a selected low intake pressure threshold at its intake, for example, less than about 0.2 psi, or other suitably low pressure. When the compressor 120 is operating correctly, its intake pressure will meet this standard. In order to verify this condition, the master controller first obtains sensor data of the intake pressure and determines at block 708 whether that pressure is above a high intake pressure threshold, such as about 0.3 psi. If the answer is no, the process proceeds to block 724. In general, in the embodiment shown herein, the low intake pressure threshold and the high intake pressure threshold are both below about 1 psig. If the compressor intake pressure is above the higher intake pressure threshold, several steps are then indicated. First, the system opens the compressor suction vent (not shown) at block 710, and checks at block 712 whether the compressor intake pressure then drops below the low intake pressure threshold. If it does, this indicates that the compressor is operating properly, and the suction vent can then be closed, as indicated at block 722, and the process can then proceed to block 724, as described above. This process takes place just before the compressor turns on. If a high pressure alarm occurs when the compressor is running, the system switches to this vent mode of operation in order to purge the high pressure.

If the opening of the suction vent does not reduce the compressor intake pressure to the below the low intake pressure threshold, this suggests that there may be some other malfunction in the system. Accordingly, in this situation the system will again measure and record sensor data at block 714, and apply the conditional logic routine at block 716 to detect the flaw. If, based on the sensor data and conditional logic algorithm the system state is found to be state 2 or 3, as indicated at block 718, a system shutdown will be commenced, as indicated at block 720.

If this check at block 718 does not disclose a system state 2 or 3, the process will return to block 712 to reconsider the compressor intake pressure. If, upon remeasurement, the compressor intake pressure is found to be below the low intake pressure threshold, the suction vent (142 in FIG. 1) can then be closed (block 722), and the process can then proceed in the manner discussed above. If the query at block 712 does not show that the intake pressure has dropped below the low intake pressure threshold, the measurement and recording of sensor data step 714 and conditional logic step 716 can be repeated until it does so. Advantageously, the master controller can be programmed to allow only a certain number of repetitions of this subroutine before initiating an error alarm and/or going to a system shutdown.

The system is kept in "Change Over FC to EL" mode 316 until confirmation from the Fuel Cell Subsystem has been sent to the Master Controller indicating that "Online EL" mode 320 can be commenced, as indicated at 318. As noted above, throughout "Change Over FC to EL" mode, if certain faults are encountered that mandate a "Control Shutdown" the Master Controller can orchestrate and command all subsystems to enter such a mode.

Figure 8:
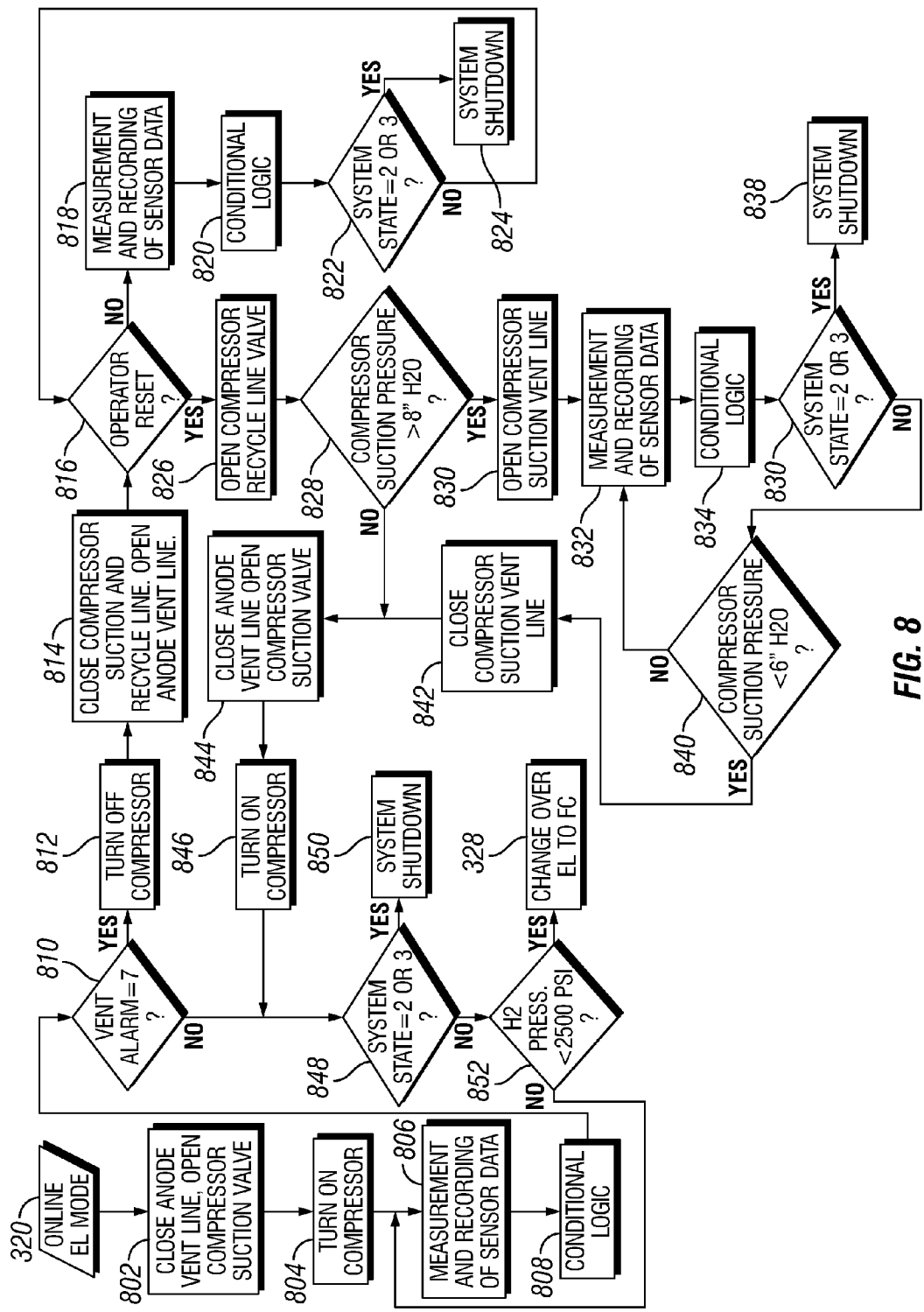
FIG. 8 is a flowchart showing steps in operation in electrolysis mode, as shown in FIG. 3.

Once the system enters online EL mode 320, the process continues as shown in FIG. 8. In "Online EL" Mode 320 the Master Controller commands all subsystems to enter "Online EL" mode. While in "Online EL" mode the Master Controller first closes the anode vent line valve (not shown) to close the anode vent (not shown) of the fuel cell unit (102 in FIG. 1), and opens the compressor suction line valve (134 in FIG. 1), as indicated at step 802, and turns on the compressor (120 in FIG. 1) at step 804. At this point, sensor measurements are taken at step 806 and the conditional logic is applied by the master controller at step 808. While in this mode, if any anomaly readings are detected, the Master Controller can determine whether to command the entire system to change to a different mode, including a shutdown mode. The ultimate objective is to keep the system in "Online EL" mode until a high pressure reading (e.g. 2500 psi or higher) is read at step 852. Once a high pressure limit is met, the Master Controller commands all subsystem to go into "Change Over EL to FC" mode 328.

Before this ultimate condition is met, the Master Controller 174 undertakes a variety of routines to obtain various types of sensor data in addition to the sensor measurements taken at step 806. Specifically, the master controller first queries at step 810 whether a vent alarm condition applies. This relates to the fuel cell exhaust vent 136. If this vent alarm condition is found to exist, the system turns off the compressor, step 812, then closes the compressor suction line valve 134 and the compressor recycle line valve 152 and opens the anode vent line at step 814. At that point, an operator reset can be received at step 816. If not, the system repeats the sensor measurements at step 818 and the conditional logic inquiry at step 820. If, upon reading the sensor data, the system is found to be in state 2 or 3, as indicated at step 822, a system shutdown is initiated at step 824. Otherwise, the process returns to step 816, waiting for an operator reset. In the absence of an operator reset at step 816, steps 818 through 822 can be repeated any number of times so long as state 2 or 3 does not occur, unless the system is programmed to limit the number of times this subroutine can be enacted.

When an operator reset is received at step 816, the master controller then opens the compressor recycle line valve (152 in FIG. 1) at step 826, and checks the compressor suction level at step 828. If the compressor intake pressure is not above the low intake pressure threshold (e.g. about 0.2 psi), as determined at step 828, the process moves on to step 844. If at step 828 the compressor intake pressure is determined to be above the low intake pressure threshold, the system then opens the compressor suction vent line (141 in FIG. 1) at step 830, and repeats the sensor measurements at step 832 and the conditional logic inquiry at step 834. If, upon reading the sensor data, the system is found to be in state 2 or 3, as indicated at step 836, a system shutdown is initiated at step 838. Otherwise, the process moves on to step 840, at which the compressor suction pressure is again detected. If at this point the compressor intake pressure is not below the low intake pressure threshold, the system then repeats the sensor measurements and conditional logic analysis at steps 832 and 834, as discussed above. These steps can be repeated until the compressor intake pressure drops to the desired range, or until some maximum number of repetitions of the process.

If the compressor intake pressure is below the low intake pressure threshold, as determined at step 840, the process moves on to step 842, at which the compressor suction vent line (141 in FIG. 1) is closed, and the process moves on to block 844, at which the anode vent line is closed, and the compressor suction valve (134 in FIG. 1) is opened. From this point the compressor is turned on at step 846, indicating that the online EL operation can presumably continue. The process then moves on to step 848, at which the system state is considered, based on the sensor data and conditional logic related to steps 806 and 808. If the system state is a 2 or 3, a system shutdown is initiated at step 850. Alternatively, the system next considers whether the hydrogen storage pressure is above the high pressure limit (e.g. 2500 psi). If the pressure is below the high pressure limit, the process returns to step 806, and the whole process of FIG. 8 is repeated, meaning the EL mode 320 continues until the hydrogen storage pressure reaches that level or some other condition indicates that another mode of operation or shutdown is suitable.

When operating in EL mode 320, once the hydrogen storage pressure reaches or exceeds the high pressure limit, the system shifts to changeover EL to FC mode 328. A flowchart showing steps in the process for changing over from electrolysis to fuel cell mode 328 is provided in FIG. 9. In "Change Over EL to FC" Mode the Master Controller commands all subsystems to enter "Change Over EL to FC" mode. The main function of this mode is to get the overall system ready for "Online FC" mode 312 again. In general, while in "Change Over EL to FC" mode 328 the Master Controller reads an array of measurements, stores, and utilizes the readings to determine the overall condition of the entire system. If any of the sensors' readings are out of range or surpass the upper or lower limits, it will command the rest of the subsystems to enter the appropriate mode.

The system is kept in "Change Over EL to FC" mode 328 until confirmation from the Fuel Cell Subsystem has been sent to the Master Controller indicating that "Online FC" mode 312 can be commenced. Throughout "Change Over EL to FC" mode 328, if certain faults are encountered that mandate a "Control Shutdown" the Master Controller orchestrates and commands all subsystems to enter such a mode.

Figure 9:
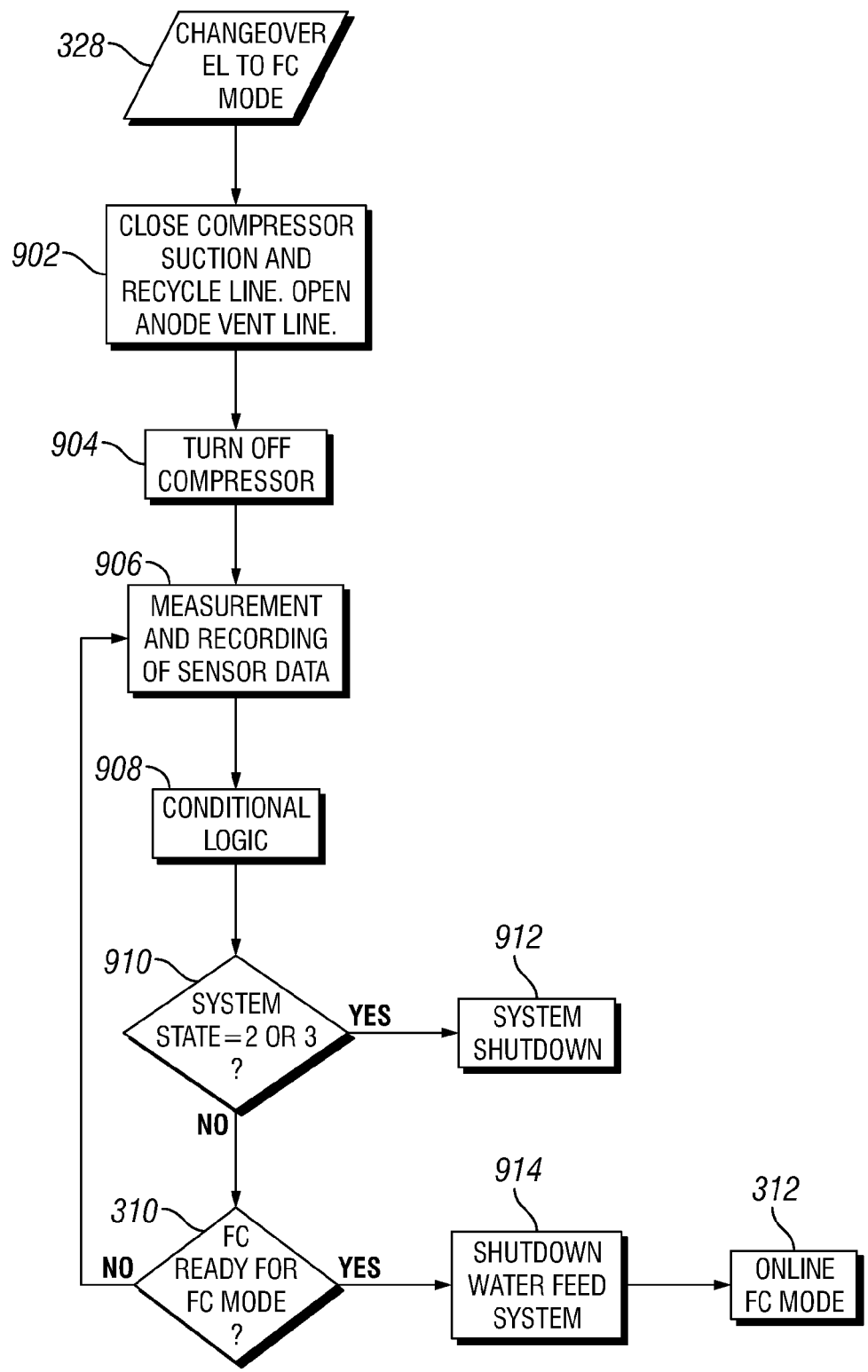
FIG. 9 is a flowchart showing steps in an embodiment of the process for changing over from electrolysis to fuel cell mode, as shown in FIG. 3.

Viewing FIG. 9, the first step in the "Change Over EL to FC" mode 328 is to close the compressor suction line (133 in FIG. 1) and the recycle line (150 in FIG. 1), as indicated at step 902. This is done by closing the compressor suction line valve (134 in FIG. 1) and the compressor recycle line valve (152 in FIG. 1). Step 902 also includes opening the anode vent line (not shown) by opening the anode vent line valve (not shown) of the fuel cell unit 102. Following these actions, the compressor is turned off at step 904. At this point, sensor measurements are taken at step 906 and the conditional logic is applied by the master controller at step 908. If the sensor data indicates that the RSOFC system is in state 2 or 3, as indicated at block 910, the master controller can initiate a system shutdown 912. Otherwise, the master controller will query whether the fuel cell is ready for FC mode at block 310. If not, the process returns to step 906 to repeat the sensor data measurement and recording and conditional logic steps.

If the fuel cell is ready to re-enter FC mode as determined at block 310, the system next shuts down the water feed system at block 914, and thereafter transitions to FC mode 312. As noted above, any time a system shutdown is initiated, if the system is not already in FC mode, the steps outlined in FIG. 9 will be performed to transition to this mode prior to the shutdown.

The RSOFC system 100 disclosed herein is a fully integrated, grid-tied RSOFC energy storage system. It is believed that a full scale system of this sort has not previously been developed. The benefits to this configuration and it method of operation are the capability to keep the solid oxide fuel cell 102 in an online mode even if other system components go offline. For example, the system can vent generated $H_2$ if the compressor 120 goes offline. The benefit to maintaining an online status of the fuel cell 102 is that repeated thermal cycles caused by repeated shutdowns can accelerate degradation of the fuel cell unit 102. Additionally, the RSOFC system 100 can be contained in a standard shipping container, and can use sea water or other abundant sources for its process water supply, making its deployment very flexible.

Although various embodiments have been shown and described, the present disclosure is not so limited and will be understood to include all such modifications and variations are would be apparent to one skilled in the art.

What is claimed is:

1. A method for transitioning between fuel cell and electrolysis modes in a Reversible Solid Oxide Fuel Cell (RSOFC) system, the method comprising:
   measuring and recording sensor data indicating a status of components associated with a reversible solid oxide fuel cell (RSOFC) system coupled to an electrical power grid, the system comprising an RSOFC unit, a hydrogen compression system, a hydrogen storage system, and a water supply, the RSOFC unit producing power when in the fuel cell mode and the RSOFC unit generating hydrogen when in the electrolysis mode;
   determining a state of the RSOFC system based on the sensor data through a conditional logic algorithm; and
   transitioning the RSOFC system between the fuel cell mode and the electrolysis mode based upon the sensor data and the system state.

2. A method in accordance with claim 1, wherein transitioning the RSOFC system between the fuel cell mode and the electrolysis mode further comprises:

heating up the RSOFC unit;
opening fluid communication between the hydrogen storage system and the RSOFC unit; and
closing fluid communication between the hydrogen compression system and the RSOFC unit, to initiate operation of the RSOFC unit in fuel cell mode.

3. A method in accordance with claim 2, further comprising verifying that a pressure of hydrogen in the hydrogen storage system exceeds a first minimum threshold pressure, prior to opening fluid communication between the hydrogen storage system and the RSOFC unit.

4. A method in accordance with claim 1, wherein transitioning the RSOFC system between the fuel cell mode and the electrolysis mode further comprises:
heating up the RSOFC unit;
closing fluid communication between the hydrogen storage system and the RSOFC unit;
opening fluid communication between the hydrogen compression system and the RSOFC unit, and opening fluid communication between the hydrogen compression system and the hydrogen storage system; and
activating the water supply to provide process water to the RSOFC unit, to allow operation of the RSOFC unit in electrolysis mode.

5. A method in accordance with claim 4, further comprising condensing water from an output stream of the RSOFC unit during operation in electrolysis mode, and recycling residual hydrogen from the output stream to an intake of the RSOFC unit.

6. A method in accordance with claim 4, further comprising verifying that a pressure of hydrogen at an intake of the hydrogen compression system is below a minimum intake pressure threshold, prior to opening fluid communication between the hydrogen compression system and an output of the RSOFC unit.

7. A method in accordance with claim 4, wherein activating the water supply comprises activating a deionization unit of the water supply, to modify a quality of the process water prior to providing the process water to the RSOFC unit.

8. A method in accordance with claim 4, further comprising:
detecting a pressure at the hydrogen storage system that equals or exceeds a high pressure threshold;
closing fluid communication between the hydrogen compression system and the RSOFC unit; and
opening an RSOFC system vent to vent hydrogen while the RSOFC unit operates in electrolysis mode.

9. A method in accordance with claim 1, wherein transitioning the RSOFC system between the fuel cell mode and the electrolysis mode further comprises:
detecting a power supply or power demand condition of the electrical power grid;
transitioning to the fuel cell mode when a power demand condition is indicated; and
transitioning to the electrolysis mode when an excess power supply condition is indicated.

10. A method in accordance with claim 1, wherein determining a state of the RSOFC system further comprises:
detecting an error condition of the RSOFC system; and
initiating a shutdown of the RSOFC system.

11. A method for controlling a system having a Reversible Solid Oxide Fuel Cell (RSOFC) unit coupled to an electrical power grid, the method comprising:
maintaining a heated state of an RSOFC unit coupled to an electrical power grid;
transitioning to an electrolysis mode of the RSOFC unit based upon sensor data indicating that the electrical power grid has excess power and that a hydrogen storage system associated with the RSOFC unit has unused capacity; and
transitioning to a fuel cell mode of the RSOFC unit based upon sensor data indicating that the electrical power grid presents power demand and the hydrogen compression and storage system has sufficient hydrogen fuel.

12. A method in accordance with claim 11, further comprising verifying that a pressure of hydrogen in the hydrogen storage system exceeds a first minimum threshold pressure while operating in fuel cell mode.

13. A method in accordance with claim 11, further comprising verifying that a pressure of hydrogen at an intake of a compressor associated with the hydrogen storage system is below a minimum intake pressure threshold while operating in electrolysis mode.

14. A method in accordance with claim 11, further comprising:
detecting a pressure at the hydrogen storage system that equals or exceeds a high pressure threshold;
closing fluid communication between a compressor associated with the hydrogen storage system and the RSOFC unit; and
venting hydrogen while the RSOFC unit operates in electrolysis mode.

15. A method in accordance with claim 11, further comprising:
detecting an error condition of the RSOFC system; and
initiating a shutdown of the RSOFC system.

16. A Reversible Solid Oxide Fuel Cell (RSOFC) system, comprising:
a hydrogen fuel source, having elevated pressure;
a water source;
a hydrogen compressor, coupled to the hydrogen fuel source;
an RSOFC unit, having a fuel cell mode and an electrolysis mode, coupled to the hydrogen fuel source, the water source, the hydrogen compressor, and to an electrical power grid; and
a controller, coupled to the RSOFC unit, the hydrogen fuel source, the water source, the hydrogen compressor, and to the electrical power grid, the controller configured to
receive sensor data regarding the hydrogen fuel source, the water source, the hydrogen compressor, and the electrical power grid;
determine a state of the RSOFC system using a conditional logic algorithm; and
switch the RSOFC unit between the fuel cell mode and the electrolysis mode depending upon the state of the RSOFC system and a power surplus or power demand condition of the power grid.

17. A system in accordance with claim 16, further comprising a vent, controlled by the controller, configured to open to vent hydrogen gas without shutting down the RSOFC unit.

18. A system in accordance with claim 17, wherein the controller is configured to open the vent in response to a pressure condition of the hydrogen gas and an operating condition of the RSOFC unit.

19. A system in accordance with claim 16, wherein the water source comprises a supply of deionized water, disposed in a closed loop with the RSOFC unit, whereby water from the water supply is provided to the RSOFC unit when in electrolysis mode, and water is recovered from the RSOFC unit when in fuel cell mode.

20. A system in accordance with claim 16, further comprising a water conditioning unit, configured to deionize input water to the system.

\* \* \* \* \*